United States Patent
Schrattenecker

(10) Patent No.: US 12,284,943 B2
(45) Date of Patent: Apr. 29, 2025

(54) CUTTING SYSTEM FOR A COMBINE HARVESTER

(71) Applicant: Franz Schrattenecker, Eggerding (AT)

(72) Inventor: Franz Schrattenecker, Eggerding (AT)

( * ) Notice: Subject to any disclaimer, the term of this patent is extended or adjusted under 35 U.S.C. 154(b) by 691 days.

(21) Appl. No.: 17/622,219

(22) PCT Filed: Jun. 24, 2020

(86) PCT No.: PCT/AT2020/060251
§ 371 (c)(1),
(2) Date: Dec. 22, 2021

(87) PCT Pub. No.: WO2020/257838
PCT Pub. Date: Dec. 30, 2020

(65) Prior Publication Data
US 2022/0346316 A1     Nov. 3, 2022

(30) Foreign Application Priority Data

Jun. 27, 2019 (AT) .............................. A 50576/2019

(51) Int. Cl.
*A01D 41/14* (2006.01)
*A01D 41/127* (2006.01)
(Continued)

(52) U.S. Cl.
CPC ......... *A01D 41/141* (2013.01); *A01D 41/127* (2013.01); *A01D 41/145* (2013.01); *A01D 57/04* (2013.01)

(58) Field of Classification Search
CPC .. A01D 41/141; A01D 41/127; A01D 41/145; A01D 57/04; A01D 57/20;
(Continued)

(56) References Cited

U.S. PATENT DOCUMENTS

| 3,967,437 A | 7/1976 | Mott et al. |
| 4,573,308 A | 3/1986 | Ehrecke et al. |

(Continued)

FOREIGN PATENT DOCUMENTS

| AT | 501588 A4 | 10/2006 |
| AT | 520625 A2 | 5/2019 |

(Continued)

OTHER PUBLICATIONS

English language Abstract for DE 3230330 A1, Feb. 16, 1994.

*Primary Examiner* — Adam J Behrens
*Assistant Examiner* — Robert E Pezzuto
(74) *Attorney, Agent, or Firm* — Tiajoloff & Kelly LLP

(57) ABSTRACT

A cutting system for a combine harvester with a support frame for a cutting table has, on the cutting side, a cutting bar fastened articulatedly to the support frame, flexible transversely to the cutting direction, and adjustable in height with respect to the support frame with axle levers distributed over the width of the cutting system engaging at one end on the cutting bar and at the other end on the support frame. Actuators and the axle levers with the cutting bar are actuated by a controller. The cutting bar has sensors distributed over the width of the cutting system. They record the ground clearance of the cutting bar in front of each axle lever. The sensors are skids on the bottom of the cutting bar measuring the ground contact pressure of the skid or the distance between the skid and the cutting bar.

20 Claims, 4 Drawing Sheets

(51) Int. Cl.
    *A01D 57/00*         (2006.01)
    *A01D 57/04*         (2006.01)
    *A01D 57/20*         (2006.01)

(58) Field of Classification Search
    CPC ...... A01D 34/04; A01D 34/14; A01D 34/246;
                            A01D 34/283; A01D 75/287
    See application file for complete search history.

(56)               References Cited

U.S. PATENT DOCUMENTS

| | | | | |
|---|---|---|---|---|
| 4,776,153 | A * | 10/1988 | DePauw | A01D 75/287 |
| | | | | 56/DIG. 15 |
| 5,713,190 | A | 3/1998 | Vermeulen et al. | |
| 2007/0193243 | A1 * | 8/2007 | Schmidt | A01D 43/06 |
| | | | | 56/181 |
| 2013/0160417 | A1 | 6/2013 | Huseman et al. | |
| 2015/0101300 | A1 | 4/2015 | Pierson | |
| 2018/0228086 | A1 | 8/2018 | Cook | |
| 2020/0337239 | A1 * | 10/2020 | Brimeyer | A01B 63/10 |
| 2020/0375107 | A1 * | 12/2020 | Duerksen | A01D 57/20 |

FOREIGN PATENT DOCUMENTS

| | | |
|---|---|---|
| DE | 3230330 A1 | 2/1994 |
| DE | 69628386 T2 | 11/2003 |
| EP | 0160823 A1 | 11/1985 |
| EP | 0765594 A1 | 4/1997 |
| EP | 2862432 A1 | 4/2015 |
| EP | 3363276 A1 | 8/2018 |
| WO | 2019/111069 A1 | 6/2019 |

\* cited by examiner

CUTTING SYSTEM FOR A COMBINE HARVESTER

FIELD OF THE INVENTION

The invention relates to a cutting system for a combine harvester, having a support frame for a cutting table, which on the cutting side has a cutting bar which is attached to the frame in an articulated manner, is flexible transversely to the cutting direction and can be adjusted in height with respect to the frame by means of a plurality of axle levers which are arranged distributed over the width of the cutting system and engage at one end on the cutting bar and at the other end on the frame, for which purpose actuators are associated with the axle levers for the purpose of setting a ground clearance, wherein the actuators and thus the axle levers can be actuated with the cutting bar by a controller in order to maintain a predetermined ground clearance of the cutting bar over the width of the cutting system.

BRIEF DESCRIPTION OF THE PRIOR ART

Such a cutting system is known, for example, from AT 520 625 A2. For harvesting various types of fruit, it is often of great advantage or necessary to provide flexible cutting bars which, if necessary, can also be converted to a rigid cutting bar. A flexible cutting bar is understood to mean a cutting bar which at least substantially adapts to the contour of the surface to be mowed transversely to the direction of travel of the combine harvester and which, for this purpose, is usually held on the frame of the cutting system by means of spring plates or longitudinal links. Via the spring plates, the mown crop is conveyed to further processing by means of a reel and a screw conveyor. In contrast, a rigid cutting bar is essentially mounted in a fixed manner, i.e. immovable, to the frame. Flexible cutting bars are particularly required for crops such as soybeans, peas and the like, or for poor harvesting conditions such as stored grain, i.e. grain laid flat by wind action, and particularly for large cutting system widths. A cutting bar that slides over the ground is naturally subject to increased wear, which is why a flexible cutting system should, if possible, only be used when the harvesting conditions absolutely require it. In order to create a cutting system for a combine harvester which allows a quick and easy adaptation of the cutting system to the given harvesting conditions, i.e. an uncomplicated change between flexible and rigid cutting system, it has already been proposed (AT 501 588 A) to provide at least one traction means between the frame and the cutting bar, by means of which the cutting bar can be displaced with respect to the frame, by overcoming the spring force, from its flexible working position with respect to the frame into a rigid working position with respect to the frame, in which rigid working position the cutting bar is fixed to the frame.

WO 2019111069 A1 discloses a cutting system with belt conveyors that convey cut material from the cutting system edge to the cutting system center. To maintain a ground clearance, a plurality of weighing cells is provided which measure the weight of the cut material resting on the cutting system. Any sagging of the cutting system as a result of the load can be compensated for by the actuators. An active adjustment of the ground clearance is not provided. The cutting system can slide over the ground and compensates the resting weight force. A similar device is known from EP 0160823 A2.

SUMMARY OF THE INVENTION

The object of the invention is therefore to provide a cutting system for a combine harvester of the type described at the outset, which enables the cutting bar to be quickly and easily adjusted to the prevailing harvesting conditions and at the same time ensures an approximately constant cutting height above the ground.

The invention solves the set object in that the cutting bar is assigned a plurality of sensors which are arranged in a distributed manner over the cutting system width, record the ground clearance of the cutting bar and are provided on the cutting bar in front of each axle lever in the cutting direction, wherein the sensors are skids arranged on the bottom side of the cutting bar for measuring the ground contact pressure of the respective skid or for measuring the distance between skid and cutting bar.

With this measure, a quick and easy adjustment of the cutting bar to the respectively given harvesting conditions is possible, wherein an almost constant cutting height above the ground can be maintained over the entire width of the cutting system. This means that soil can be reliably prevented from being pushed onto the ground as a result of insufficient clearance during the harvesting process on uneven ground. The sensors should naturally be positioned as far forward as possible on the cutting system. It is also conceivable to have skids projecting forwards over the cutting system, to which the sensors are assigned. According to the invention, the cutting bar, which is flexible transversely to the direction of travel of the combine harvester, is thus actively tracked in permitted ranges, for example ±10-20 cm out of a neutral position, to the contour of the surface to be mowed. The controller, in particular a vehicle controller, controls the actuators and thus the axle levers with the cutting bar in such a way that a ground clearance of the cutting bar specified by an operator is maintained over the width of the cutting system and, in particular, avoids cutting of the cutting bar into soil.

Particularly robust sensors suitable for use on a harvesting machine are skids arranged on the ground side of the cutting bar and measure the ground contact pressure of the respective skid with weighing cells or the distance between skid and cutting bar. The contact pressure of a skid arranged in a spring-mounted manner on the cutting bar corresponds to the distance or can be converted into the distance value.

For the best possible cutting result and for optimum ground tracking of the cutting bar, it is advantageous that in each case at least one sensor is provided on the cutting bar in front of each axle lever in the cutting direction.

It is particularly advantageous if the axle levers are designed as articulated parallelograms which engage on the cutting bar at one end and on the frame at the other. This ensures that the cutting bar is always aligned parallel to the ground in the course of the ground tracking and that the cutting angle remains the same regardless of the ground clearance. In addition, this prevents the cutting bar from twisting transversely to the cutting direction, about a transverse axis of the cutting system, which reduces wear on the cutting system and the required drive power.

In order to be able to follow the contour of the surface to be mowed cleanly and to avoid excessive tension in the cutting bar, the axle levers can engage with the cutting bar via compensating bearings with a pivot axis parallel to the cutting direction.

Robust and easy-to-maintain design conditions result when the actuators engage the frame on one side and the axle lever on the other.

In order to avoid an undesired contact with the cutting bar in a cutting system with a cut material intake reel whose distance to the cutting bar can be adjusted with a height adjustment, it is proposed that a position sensor is assigned to the cut material intake reel and that the height adjustment and thus the material intake reel can be controlled with the controller in such a way that a predetermined minimum distance between the cutting bar and the material intake reel is maintained. If a contact damaging the reel or the knife is to be avoided, a sensor determines the respective position of the reel and lifts it accordingly up in case of an imminent collision and thus out of the danger zone. The height adjustment can consist of one or two serially connected hydraulic cylinders. If two hydraulic cylinders are provided, one takes over the coarse adjustment which can be predefined by an operator and the other ensures the automatic position correction by means of the controller. This ensures that the cutting bar does not cut off the cut material reel tines, even if an operator wants to keep the reel on the ground as much as possible by manually setting the height. The described control of the height adjustment for the cut material intake reel can be used with any known cutting system with cutting bars that are flexible transversely to the cutting direction.

The support frame with cutting bar and actuators can preferably be guided in a longitudinally displaceable manner in the cutting direction on a base frame carrying the cut material intake device for the purpose of setting a cutting table length.

The actuators are preferably formed in particular by pneumatic cylinders or pneumatic bellows, which on the one hand are supported on the support frame and which on the other hand engage on an axle lever between a support frame bearing of the axle levers and the cutting bar. Actuators can be provided on both sides of the axle levers, which are coupled via a bridge spanning the axle levers, wherein the bridge engages on the associated axle lever by means of corresponding means.

This means that the actuator can be integrated into a support frame which is guided in a longitudinally movable manner on the base frame with minimal space requirements, and the cutting table length can also be adjusted as required within specified limits.

BRIEF DESCRIPTION OF THE DRAWINGS

In the drawing, the subject matter of the invention is shown by way of example, wherein.

DETAILED DESCRIPTION OF THE PREFERRED EMBODIMENTS

Figure 1:
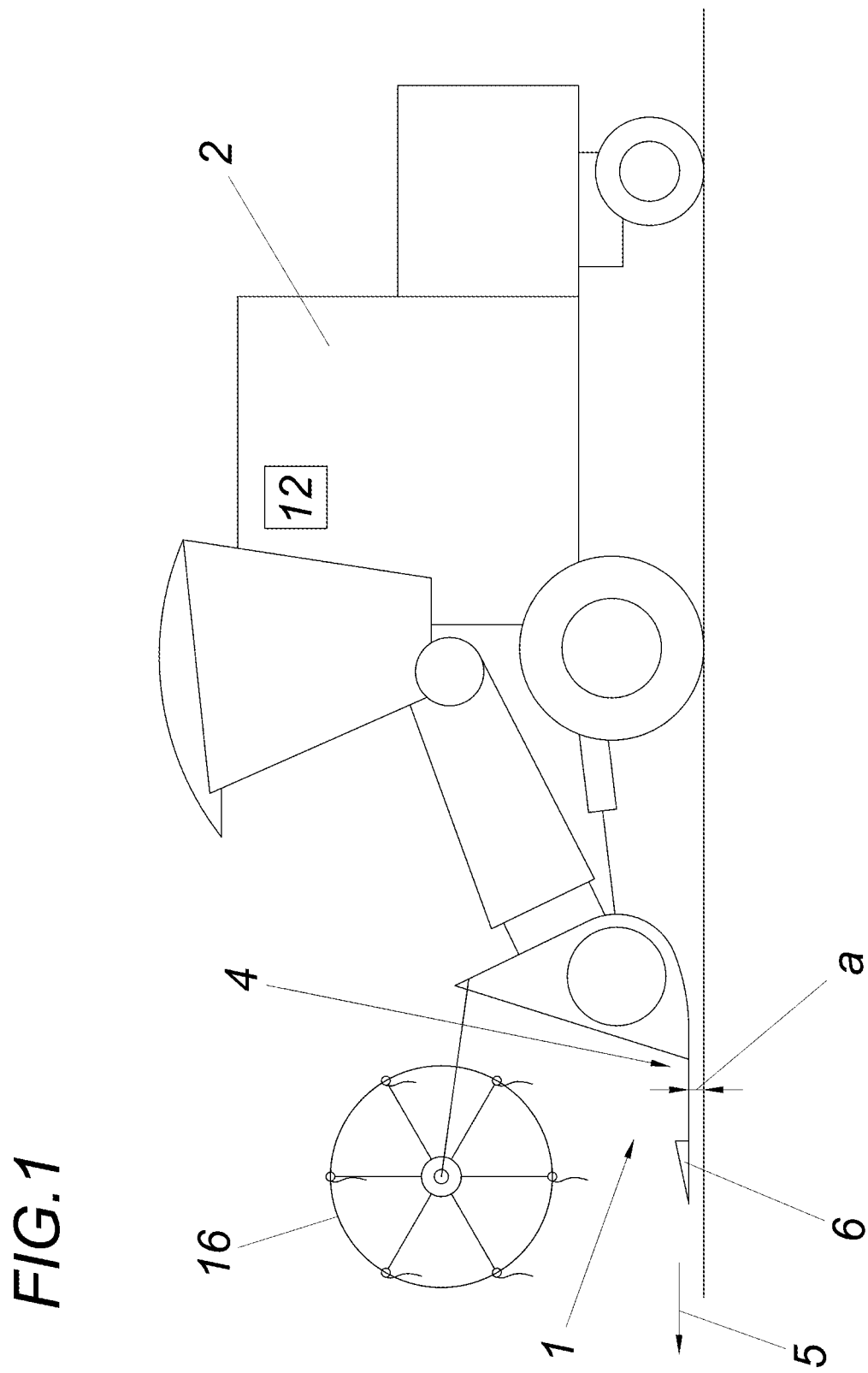
FIG. 1 shows a combine harvester with one cutting system in side view.

A cutting system 1 for a combine harvester 2 comprises a support frame 3 for a cutting table 4 which has, on the cutting side, a cutting bar 6 which is attached in an articulated manner to the support frame 3 and is flexible transversely with respect to the cutting direction 5. The cutting bar 6 is height-adjustable with respect to the support frame 3 by means of a plurality of axle levers 7 distributed over the width of the cutting system and engaging at one end on the cutting bar 6 and at the other end on the support frame 3. For the purpose of setting a ground clearance, the axle levers 7 are assigned actuators 8 with which the height position of the cutting bar 6 can be variably set with respect to the support frame 3 over the width of the cutting bar. Corresponding flexible transfer plates 10 are provided for transferring the material to be cut away from the cutting bar 6 to a cut material intake device 9.

The actuators 8 are formed in particular by pneumatic cylinders or pneumatic bellows, which on the one hand are supported on the support frame 3 and which on the other hand engage on an axle lever 7 between a support frame bearing and the cutting bar 6. For this purpose, actuators 8 are provided on both sides of the axle levers 7, which are coupled via a bridge spanning the axle levers 7, wherein the bridge engages on the associated axle lever 7. For the purpose of adjusting the cutting table length in the cutting direction, the support frame 3 can be guided longitudinally displaceably on a base frame carrying the cut material intake device 9. This means that the actuator can be integrated into a support frame 3 guided longitudinally displaceably on the base frame with a small space requirement, and the cutting table length can also be adjusted as desired within predetermined limits. Moreover, in the area of the cutting table, overlapping shingle-like transfer plates are provided for the cut material, which allow the length to be compensated.

According to the invention, the cutting bar 6 is assigned a plurality of sensors 11 which are distributed over the width of the cutting bar and record the ground clearance of the cutting bar 6. A controller 12 controls the actuating drives 8 and thus the axle levers 7 with the cutting bar 6 in such a way that a predetermined ground clearance a of the cutting bar 6 is maintained over the width of the cutting system.

The sensors 11, in particular weighing cells, are skids 13 arranged on the ground side of the cutting bar 6 and measure the ground contact pressure of the respective skid 13 or measure the distance between the skid 13 and the cutting bar 6. In the cutting direction 5, in each case at least one sensor 11 is provided on the cutting bar 6 in front of each axle lever 7.

The axle levers 7 are designed as articulated parallelograms which engage at one end on the cutting bar 6 and at the other end on the frame 3 and are mounted in corresponding bearing blocks. In addition, the axle levers 7 engage on the cutting bar 6 via compensating bearings 14 with a pivot axis parallel to the cutting direction 5, which cutting bar 6 is only shown very schematically in the figures. The actuators 8, for example hydraulic cylinders, engage on the one hand on the support frame 3 and on the other hand on the axle lever 7. The pivot position of the axle lever 7 can be detected with position sensors 15.

Figure 2:
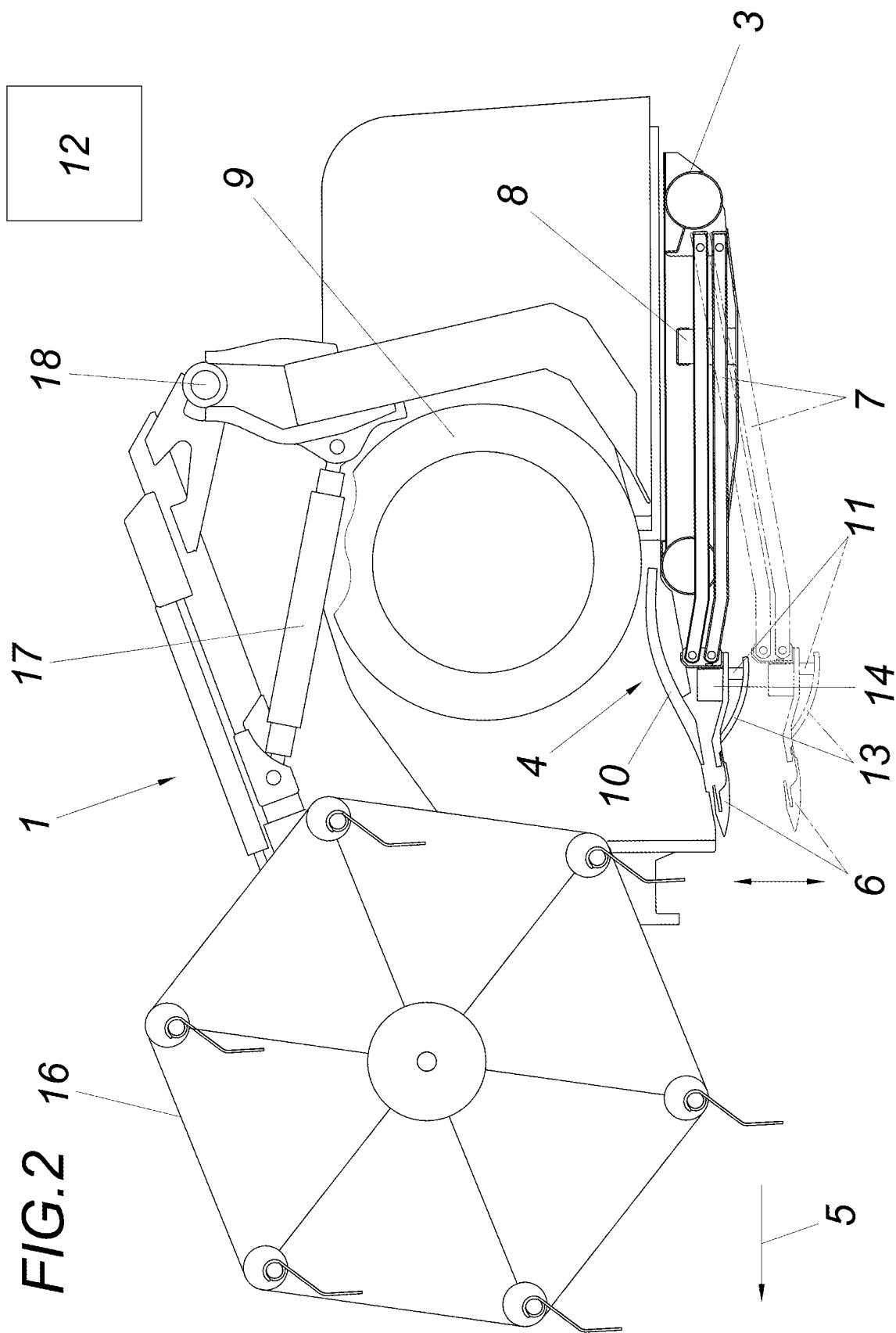
FIG. 2 shows a partially intersected side view of a cutting system according to the invention.
Figure 3:
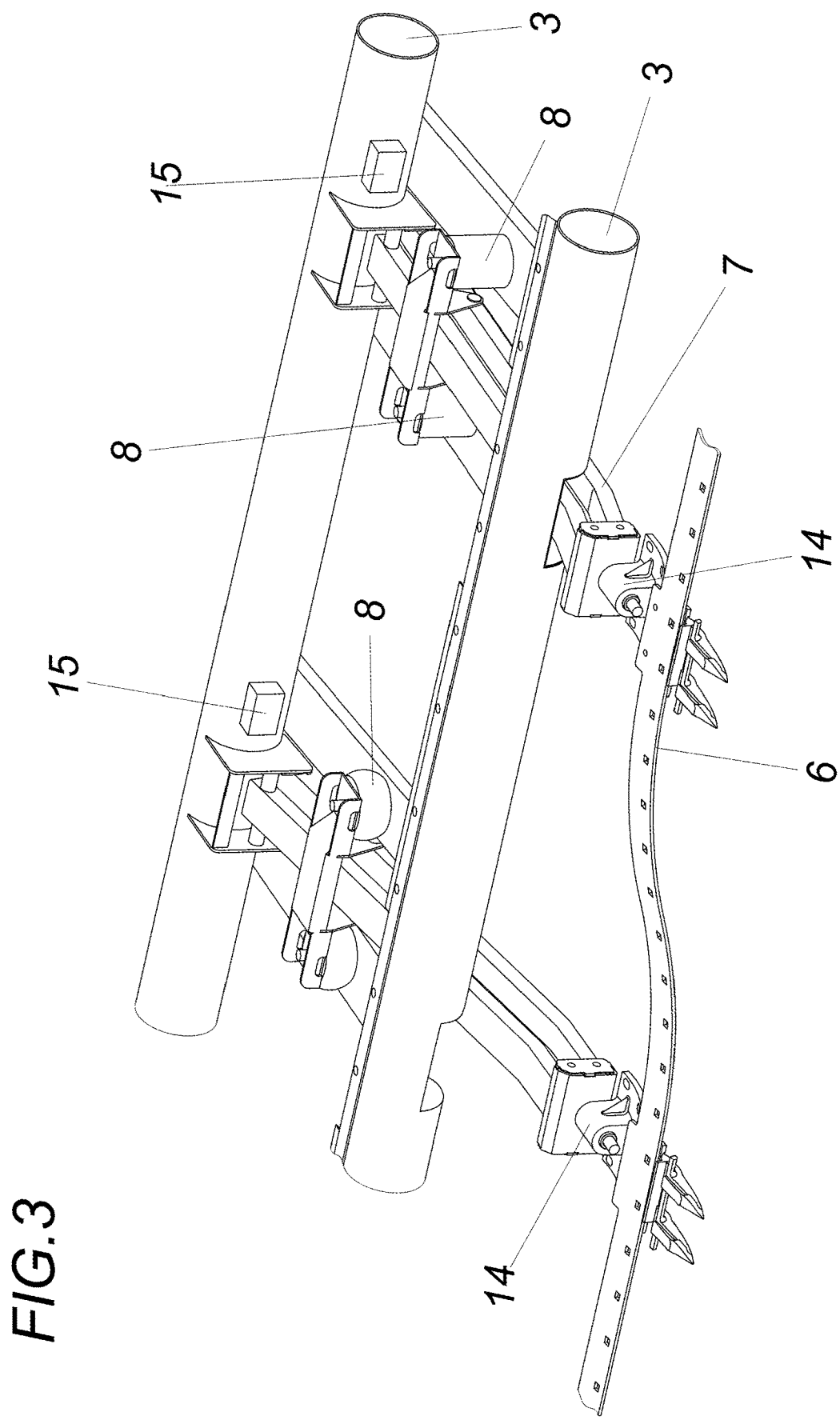
FIG. 3 shows an enlarged section of a cutting bar suspension of the cutting system from FIG. 2 in oblique view.
Figure 4:
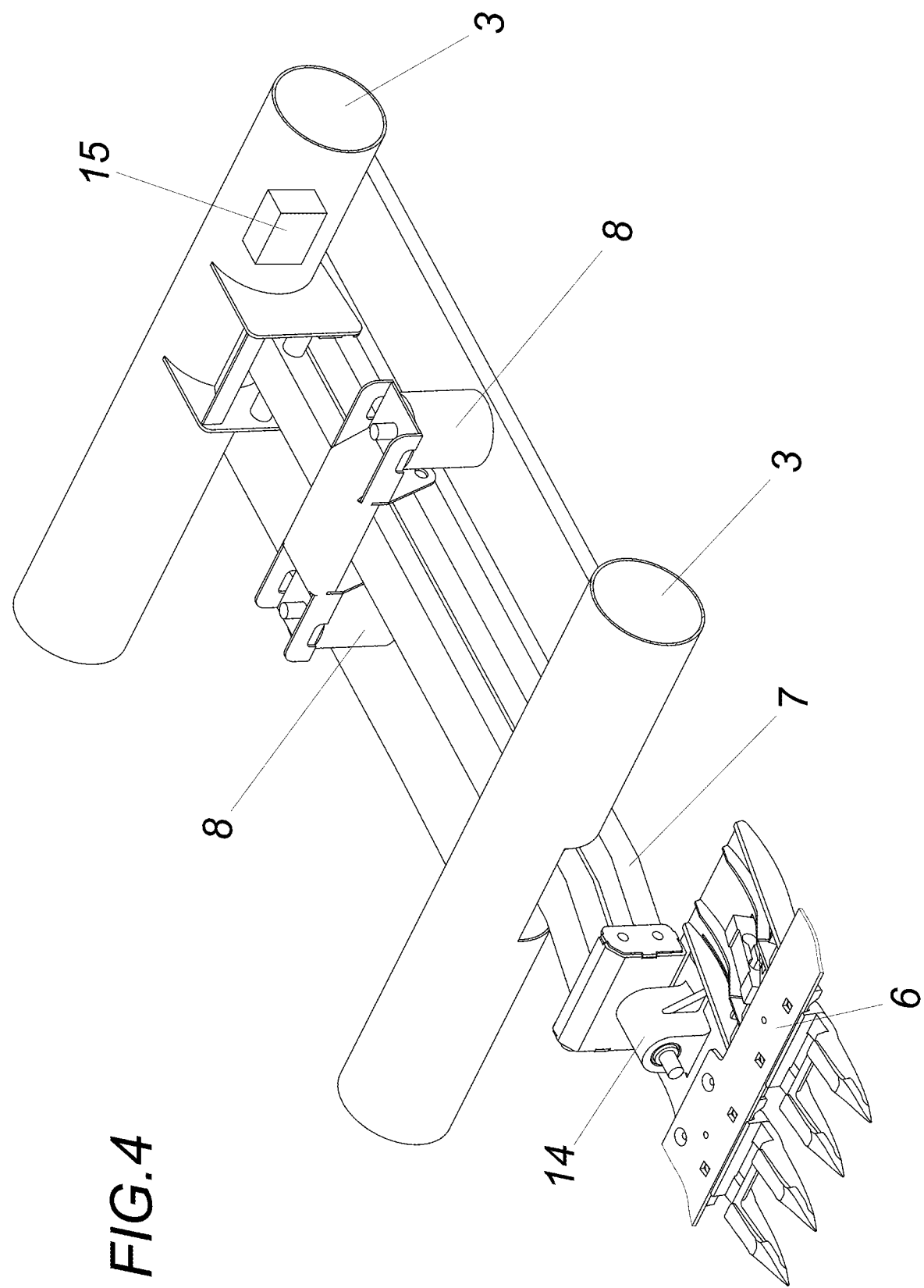
FIG. 4 shows an enlarged section of the cutting bar suspension from FIG. 3 in oblique view.

FIG. 2 shows a cutting system having a cut material intake reel 16, the distance of which from the cutting bar 6 can be adjusted by means of a height adjustment 17, wherein a position sensor 18 is associated with the material intake reel 16, and wherein the control 12 controls the height adjustment 17 and thus the cut material intake reel 16 in such a way that a predetermined minimum distance between cutting bar 6 and material intake reel 16 is maintained. The height adjustment 17 may comprise one or two hydraulic cylinders connected in series. If two hydraulic cylinders are provided, one takes over the coarse adjustment which can be preset by an operator and the other ensures the automatic position correction by means of the controller 12.

The invention claimed is:

1. A cutting system for a combine harvester, said cutting system comprising:

a support frame supporting a cutting table that has, on a cutting side, a cutting bar that is articulatedly connected to the support frame, said cutting bar being flexible transversely to a cutting direction, and supported so as to be adjusted in height with respect to the support frame by a plurality of axle levers that are distributed over a width of the cutting system; and said axle levers each having one end engaging with the cutting bar and another end engaging with the support frame;

actuators associated with the axle levers adjusting the height of the cutting bar so as to provide for setting a ground clearance;

wherein the actuators and the associated axle levers with the cutting bar are controlled by a controller that maintains the ground clearance at a predetermined ground clearance of the cutting bar over a width of the cutting bar;

wherein the cutting bar is associated with a plurality of sensors that are arranged distributed over the width of the cutting system, said sensors recording the ground clearance of the cutting bar, and being provided in front of each axle lever on the cutting bar in the cutting direction; and wherein the sensors comprise skids arranged on a bottom side of the cutting bar, and each of said skids measures a respective ground contact pressure of the skid or a respective distance between the skid and the cutting bar.

2. The cutting system according to claim 1, wherein the axle levers are articulated parallelograms that have one end engaging with the cutting bar another end engaging with the support frame.

3. The cutting system according to claim 1, wherein the axle levers engage the cutting bar via compensating bearings with a pivot axis parallel to the cutting direction.

4. The cutting system according to claim 1, wherein each of the actuators engages the support frame and one of the axle levers.

5. The cutting system according to claim 3, wherein the actuators include pneumatic cylinders or pneumatic bellows that are supported on the support frame and that engage one of the axle levers between a support frame bearing of said axle lever and the cutting bar.

6. The cutting system according to claim 4, wherein the actuators include pneumatic cylinders or pneumatic bellows that are supported on the support frame and that engage one of the axle levers between a support frame bearing of said axle lever and the cutting bar.

7. The cutting system according to claim 1, wherein the support frame with the cutting bar and the actuators is guided longitudinally displaceably in the cutting direction on a base frame carrying a cut material intake device so as to set a cutting table length.

8. The cutting system according to claim 1, wherein the actuators include pneumatic cylinders or pneumatic bellows that are supported on the support frame and that engage one of the axle levers between a support frame bearing of said axle lever and the cutting bar.

9. The cutting system according to claim 8, wherein some of the actuators are on sides of one of the axle levers and are coupled via a bridge spanning the axle levers, wherein the bridge engages the associated axle lever.

10. The cutting system according to claim 2, wherein the axle levers engage the cutting bar via compensating bearings with a pivot axis parallel to the cutting direction.

11. The cutting system according to claim 2, wherein the actuators engage the support frame and the axle lever.

12. The cutting system according to claim 3, wherein the actuators engage the support frame and the axle lever.

13. The cutting system according to claim 10, wherein the actuators engage the support frame and the axle lever.

14. The cutting system according to claim 2, and further comprising a cut material intake reel supported at distance from the cutting bar, said distance being adjusted by means of a height adjustment;

wherein a position sensor is associated with the cut material intake reel, and wherein the controller controls the height adjustment and the cut material intake reel in such a way that a predetermined minimum distance between the cutting bar and the cut material intake reel is maintained.

15. The cutting system according to claim 2, wherein the actuators include pneumatic cylinders or pneumatic bellows that are supported on the support frame and that engage one of the axle levers between a support frame bearing of said axle lever and the cutting bar.

16. A cutting system for a combine harvester, said cutting system comprising:

a support frame supporting a cutting table that has, on a cutting side, a cutting bar that is articulatedly connected to the support frame, that is flexible transversely to a cutting direction, and that is adjusted in height with respect to the support frame by a plurality of axle levers that are distributed over a width of the cutting system and that have one end engaging with the cutting bar and at another end engaging with the support frame;

the height being adjusted by actuators that are associated with the axle levers so as to provide for setting a ground clearance;

wherein the actuators and the associated axle levers with the cutting bar are controlled by a controller that maintains the ground clearance at a predetermined ground clearance of the cutting bar over a width of the cutting bar;

wherein the cutting bar is associated with a plurality of sensors that are arranged distributed over the width of the cutting system, that record the ground clearance of the cutting bar, and that are provided in the cutting direction in front of each axle lever on the cutting bar; and wherein the sensors are skids arranged on a bottom side of the cutting bar and each measure a ground contact pressure of the respective skid or a distance between the skid and the cutting bar;

and further comprising a cut material intake reel supported at distance from the cutting bar, said distance being adjusted by means of a height adjustment;

wherein a position sensor is associated with the cut material intake reel, and wherein the controller controls the height adjustment and the cut material intake reel in such a way that a predetermined minimum distance between the cutting bar and the cut material intake reel is maintained.

17. The cutting system according to claim 16, wherein the support frame with the cutting bar and actuators is guided longitudinally displaceably in the cutting direction on a base frame carrying a cut material intake device so as to set a cutting table length.

18. The cutting system according to claim 16, wherein the height adjustment includes two serially connected hydraulic cylinders, each for a respective side of said cut material intake reel.

19. The cutting system according to claim 16, wherein the actuators include pneumatic cylinders or pneumatic bellows that are supported on the support frame and that engage one of the axle levers between a support frame bearing of said axle lever and the cutting bar.

20. The cutting system according to claim 18, wherein the actuators include pneumatic cylinders or pneumatic bellows that are supported on the support frame and that engage one of the axle levers between a support frame bearing of said axle lever and the cutting bar.

\* \* \* \* \*